Patented July 3, 1928.

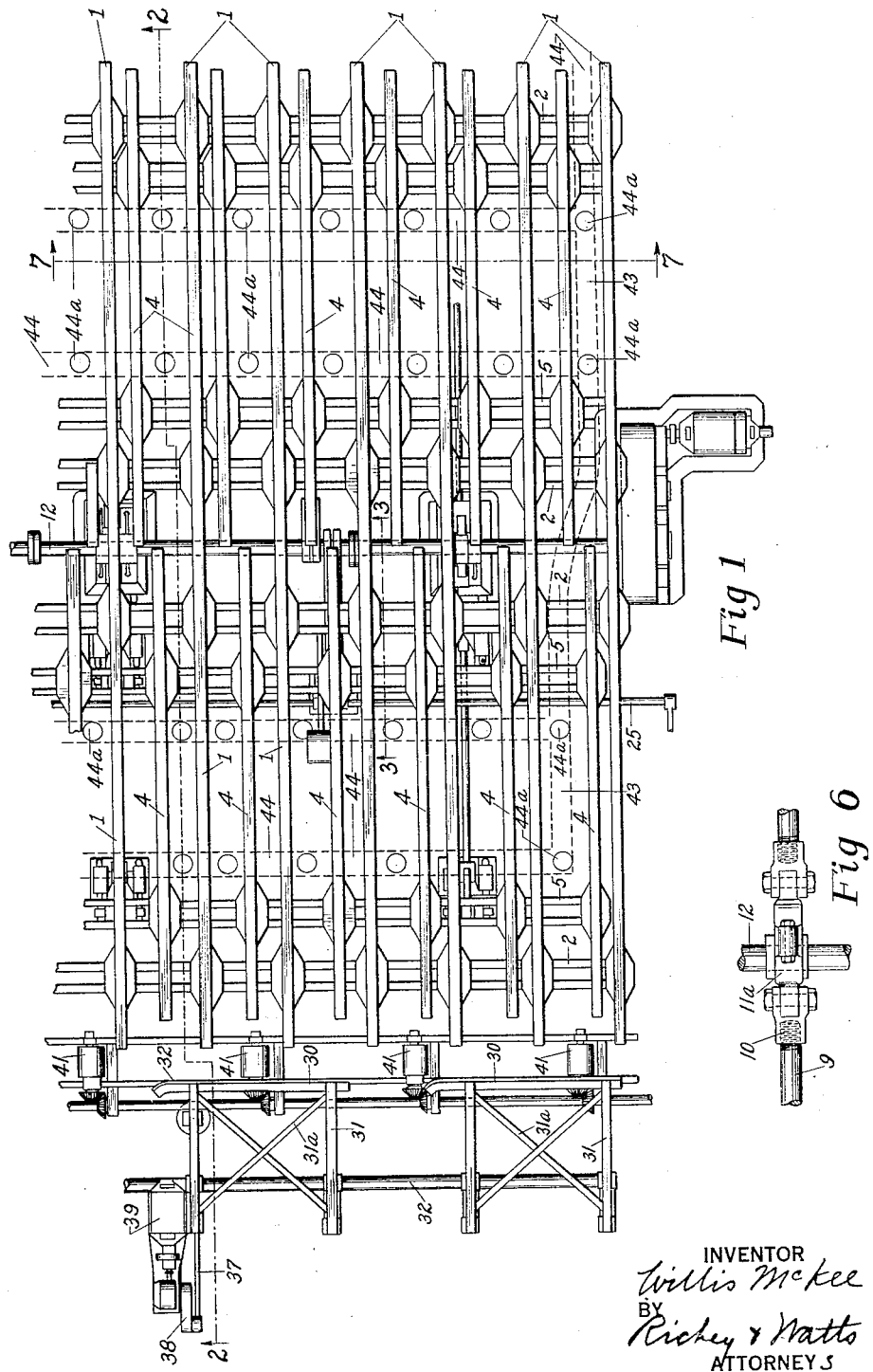

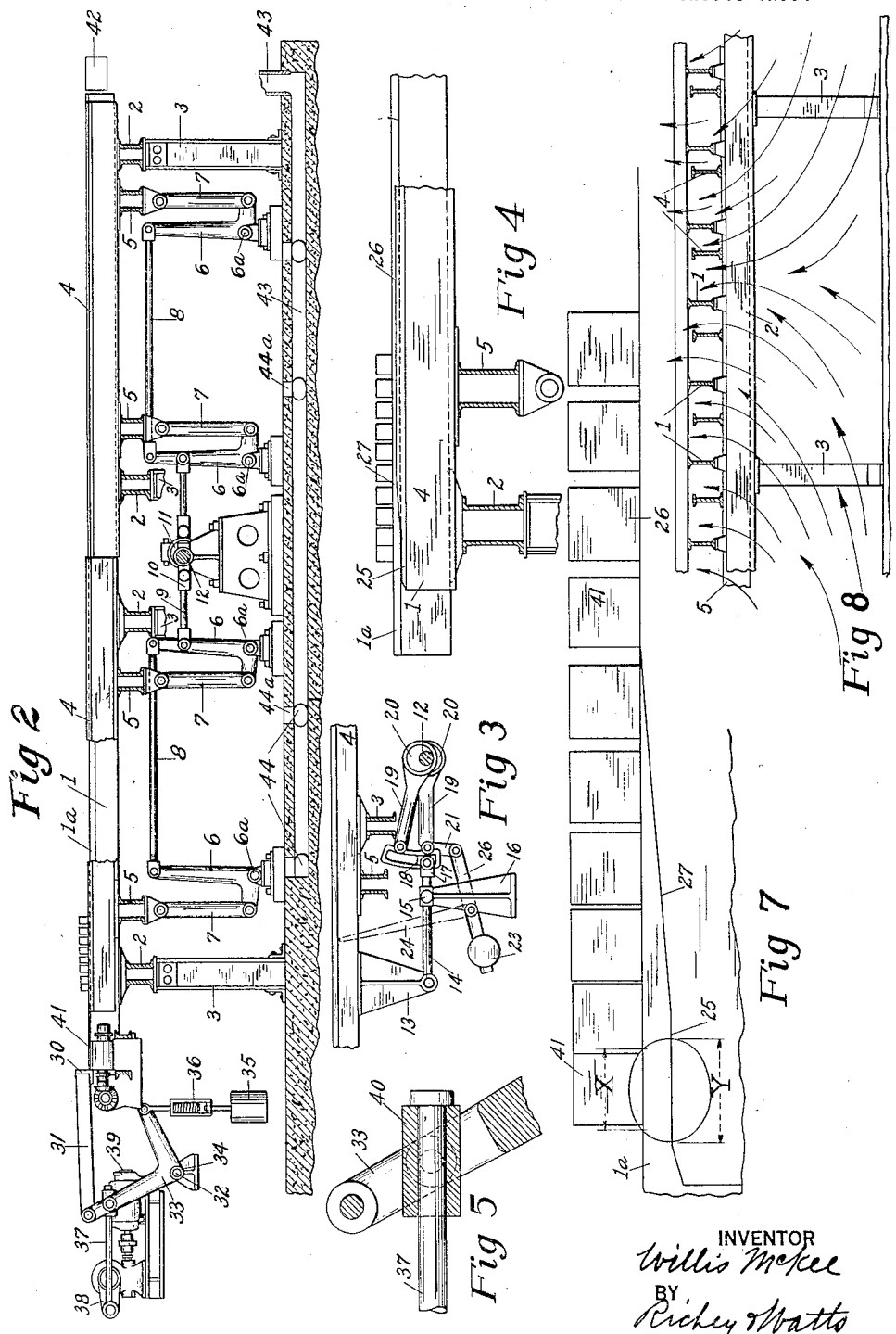

1,675,950

UNITED STATES PATENT OFFICE.

WILLIS McKEE, OF CLEVELAND, OHIO, ASSIGNOR TO CENTRAL NATIONAL BANK OF CLEVELAND, OF CLEVELAND, OHIO, A CORPORATION OF OHIO.

METHOD OF COOLING WORK BLANKS.

Original application filed October 22, 1925, Serial No. 64,194. Divided and this application filed June 18, 1926. Serial No. 116,871.

This invention relates to hot beds and to the art of cooling elongated heated articles. It is particularly concerned with an improved and expeditious method of cooling elongated metallic articles from high temperatures and with apparatus for practicing such method and conveying such articles through a cooling zone.

Apparatus embodying my present invention resembles, in certain respects, apparatus of which I was joint or sole inventor and which is described in United States Letters Patent No. 754,229, issued March 8th, 1904; No. 771,438, issued October 4th, 1904, and No. 1,486,984, issued March 18th, 1924, and also resembles, in certain respects, apparatus disclosed in my co-pending application, Serial No. 668,890, filed October 16th 1923. In the apparatus of the foregoing patents and application, it was impossible automatically to space the work blanks or heated articles apart from each other distances which are a given percentage of the widths of the articles and then maintain such spacing for the remainder of their travel through the cooling zone. It is desirable, under certain conditions, to accomplish such separation and to maintain distances between adjacent work blanks, which are preferably a predetermined percentage of the horizontal width of the particular articles being conveyed and cooled. One important advantage of such separation is that a new and improved method of cooling the articles may be practiced. Accordingly, one important object of my invention is to construct a hot bed in which the distance between adjacent work blanks may be changed automatically by a given percentage of the width of one of the articles and then maintained constant.

In the apparatus of the above mentioned patents and application, the work blanks were delivered to the stationary members by positively actuated means which did not require very close adjustment or accurate control of the speed or length of travel thereof. For practicing my improved method of cooling, however, it is desirable that the work blanks be delivered to the stationary members with not more than a predetermined force nor beyond a predetermined position. Accordingly, another object of my invention is to construct adjustable feeding apparatus for delivering elongated work blanks with any predetermined force onto the stationary members of a hot bed.

Other objects and advantages will appear and be pointed out in the following specification and illustrated in the drawings, in which one form of apparatus embodying and for use in practicing my invention is shown, in which:

Fig. 1 is a top plan view of a hot bed embodying my invention;

Fig. 2 is a side view, partly in section, taken on line 2—2 of Fig. 1;

Fig. 3 is a side view, partly in section, taken on line 3—3 of Fig. 1;

Fig. 4 is an enlarged, fragmentary view of the receiving end of the hot bed onto which work blanks are delivered;

Fig. 5 is a fragmentary view, partly in section, of a portion of the feeding device;

Fig. 6 is an enlarged, fragmentary view showing parts of the driving mechanism;

Fig. 7 is a diagrammatic view illustrating the manner in which the distance between adjacent articles on the hot bed is varied and the manner of accomplishing this variation; and Fig. 8 is a diagrammatic view showing the flow of cooling fluid through the illustrated apparatus according to my invention.

In the drawings, the stationary members 1 are secured to cross members 2, carried on suitable foundations 3. These members 1 constitute supports along which articles or work blanks may be moved from one end to the other thereof, the members 1 all being arranged with their top surfaces in substantially the same horizontal plane. Movable members 4 cooperate with the stationary members for moving the articles along the stationary members. I preferably form these movable members 4 of such length that two or more of these members arranged end to end are substantially equivalent in length to the length of a single stationary member 1. As shown in the drawings, the movable members 4 are preferably arranged and connected in sets by cross members 5 so as to function as units, one set extending from adjacent to the receiving end of the stationary members 1 and overlapping with the next set. Obviously a single set or more than two sets of movable members may be employed if and when desired.

The members 4 of each set have top surfaces arranged in one or more planes substantially parallel to the plane of the top surfaces 1ª of the stationary members 1. The members 4 are positioned for movement of their top surfaces in orbits above and below the top surfaces 1ª, so as to carry the articles intermittently along the stationary members 1 from the receiving end thereof toward the delivery end thereof. When each set of members 4 are provided with two parallel top surfaces, these surfaces are arranged in different planes so that the axes of rotation parallel to the surface 1ª will lie one above the other, and the orbits will be parallel to each other. I prefer that the movable members shall move in a substantially elliptical orbit and accomplish this by apparatus including bell-cranks 6 which are connected at one end to the beams 5 by links 7 and at the other end to each other by a link 8. The two bellcranks 6 thus move in unison and when pivoting about their pivot points 6ª serve to raise and lower the movable members of a set simultaneously and to the same extent. Means for moving the bell-cranks 6 about their pivot points 6ª includes a link 9 threaded right and left at opposite ends, a coupling 10 screw threaded thereto at one end and an eccentric strap 11ª hinged thereto and having bearing engagement with an eccentric 11 on drive shaft 12. As the shaft 12 rotates, the eccentric 11 reciprocates the link 9, thereby actuating the bell-cranks 6 about their pivot points 6ª and raising and lowering the moving members 4. The elevation of the orbit of the movable members with respect to the top surface 1ª of the stationary members may be varied by adjustment of the link 9, it being understood that when the effective distance from the drive shaft 12 to the adjacent bell-crank 6 is decreased, the elevation of the top surface of the members above the top surface 1ª, at the highest point of travel of the movable members, is correspondingly increased while an increase in the effective distance between the drive shaft 12 and the adjacent bell-crank 6 will correspondingly lower the movable members 4 and decrease the extent to which they may rise above the top surface 1ª of stationary members 1. Where two sets of movable members 4 are employed, as shown herein, each set can be similarly constructed. In Fig. 6 is shown an eccentric strap 11ª connected to two links 9 and engaging with one eccentric 11 to actuate the two sets of movable members from shaft 12. The sets as thus connected will counter-balance each other, that is, as one set is moving downwardly in its orbit, the other set will be moving upwardly in its orbit, thereby decreasing the energy required to actuate the two sets of movable members as will be understood by those skilled in the art.

To produce movement of the movable members in a direction of their length, I provide apparatus substantially as shown in Fig. 3, wherein a bracket 13, carried by the set of movable members, is attached to one end of a rod 14, which is mounted for reciprocation in a bearing 15 on a supporting member 16. The other end of the rod 14 carries a member 17 which engages within the arcuate shaped member 18 of a Stephenson link device, which device includes connecting rods 19 attached to either end of the member 18, each rod being shaped to receive an eccentric 20 mounted on and driven by a drive shaft which may be main shaft 12. Means for changing the location of member 18, with respect to member 17, comprises a link 21 joined to the member 18 and a lever 26 pivoted to the support 16 and counter-weighted as at 23. A hand lever 24, operating through a shaft 25, serves to move the member 26 about its support and to vary the length of the stroke of the rod 14 and consequently of the movable members 4. Rotation of the shaft 12 is thus translated into reciprocating motion of the link 14 and movable members 4.

It will be understood that when the shaft 12 is rotating, both the links 10 and rod 14 will be reciprocating with the result that the movable members 4 will be given vertical and horizontal motions simultaneously resulting in travel in a substantially elliptical orbit.

With the members 17 and 18 in a neutral position, the travel of members 4 will be in substantially a vertical line, but by suitably adjusting members 17 and 18 the member 4 may be caused to travel either forward or backward in an elliptical orbit having a vertical axis the same length as the vertical line and a horizontal axis equal to the maximum throw of the link motion.

Referring particularly to Figs. 2, 4 and 7, it will be seen that the movable members 4 are provided, near the receiving end of the hot bed, with substantially horizontal surfaces 25 and 26 disposed in planes one above the other, connected by an inclined surface 27. The adjustment of the members 4 and spacing of surfaces 25 from surfaces 26 is such that both the surfaces 25 and 26 may move between levels above as well as below the top of the stationary members 1.

As will more clearly be understood by referring to Fig. 7, where the top surfaces 26 and the horizontal axis of rotation of the movable members coincide with the top surfaces 1ª of the stationary members, the length of horizontal travel of a given work blank 41 carried by the surfaces 25, which are disposed below surfaces 1ª, is represented by "X". The horizontal length of travel of the work blanks on surfaces 26 is represented by "Y". The "Y" dimension is approximately equal to the horizontal axis of the ellipse through which the movable members travel and represents the horizontal distance through which the articles 41 are moved during the movement of the surfaces 26 through one cycle. Inasmuch as the surfaces 25 are disposed below the surface 26, they will move about the surfaces 1ª only during less than half of their movement, this portion being represented by the dimension "X." Since the various parts of the surfaces 27 will move progressively varying distances above the top surfaces 1ª of the stationary members from a minimum at the junction with surfaces 25 to a maximum at its junction with surface 26, it naturally follows that articles carried thereby will be moved progressively greater longitudinal distances as they are carried by succeeding portions of the inclined surfaces 27. Consequently, articles delivered in side by side relation onto the surfaces 25 will be moved through progressively increasing distances as they are carried by surfaces 27, thus resulting in a progressively increasing distance between adjacent articles. That is, if a piece has a width equal to X then the space between adjacent pieces is equal to Y—X, and space between pieces of other widths will vary proportionally to their width.

Feeding apparatus for delivering articles or work blanks to the hot bed is shown in Figs. 1, 2 and 5, where 30 indicates a pusher connected by a suitable frame work, including bars 31 and braces 31ª, through a shaft 32, to a lever 33 pivoted as at 34 and secured at one end to the bars 31 and at the other end to a weight 35 with a shock absorbing spring 36 interposed between the weight and the lever. This lever 33 is positively actuated, in the direction to retract one or more of the pushers 30, by means of a rod 37 connected to a suitable crank arm 38, which arm may be actuated by a motor or other device 39, which rod 37 has a sliding or lost motion connecton in a sleeve 40 pivotally carried by the arm 33. Movement of the rod 37 toward the left in Fig. 2 will pivot the arm 33 about its pivot arm 34, thereby retracting the pusher 30 positively. Movement of the rod 37 in the opposite direction permits pivoting of the arm 33 about its point 34 under the influence of the weight 35, the lost motion connection between sleeve 40 and rod 37 permitting this movement to be independent of that of the rod 37. By selecting weights 35 suitable for the different materials to be handled and also by predetermining the desired length of travel of the weight 35, the speed of travel of the pusher 30 and the force with which it travels may be readily predetermined and adjusted. The pushers thus move work blanks 41 from conveyor rolls 42 on the stationary members 1 with sufficient force to carry them to, but not beyond, a predetermined point thereon. If the work blanks are delivered beyond the predetermined point on the stationary members, they may disarrange the spacing between adjacent articles already accomplished wholly or in part by the inclined surface 27 of the members 4. In other words, the force of the pusher with each different material to be handled will be so adjusted as not to be great enough to close up the articles after they are separated. It will be understood that the straight-edge pushers 30 contact the side of an article while the latter is in a heated, more or less pliable or deformable condition and in pushing the article toward the cooling zone serve to straighten the article. The next succeeding article is similarly straightened and also by lateral contact with the preceding straightened article so that every article impelled by the force of the pushers is straightened before passing into the cooling zone. I prefer to bevel the ends of the movable members 4, adjacent to the conveyor rolls 42, downwardly sufficiently far so that regardless of the adjustment of the movable members the receiving end thereof will never rise above the top surface of the stationary members 1.

I have shown two pushers 30 complete with their necessary parts, but it will be understood that a greater or less number of such pushers may be employed, the number being determined by the nature and size of the material to be delivered from the conveyor to the hot bed.

In cooling articles and particularly large metallic articles, such as steel rails, billets and the like, where the articles are transported through the cooling zone of a hot bed in substantially side to side contact, the cooling of the heated members, as practiced heretofore, has taken place very slowly. The cooling was accomplished largely by air that came into contact with the top of the articles. The air beneath the articles escaped but slowly so that the bottoms of the articles remained hot a long time. With the articles in side to side contact, little or no cooling of the sides was possible. The air drawn above the articles cooled the ends first and the middles last. The whole process was slow and the results not entirely satisfactory, since the resultant warpage was a disadvantage where the articles being cooled were in finished form. Moreover, the bed itself became highly heated and often warped. Where attempts were made to space the articles apart from each other the bed at once became inefficient with all articles except perhaps those of one certain width, due to the resulting unnecessary voids or unoccupied spaces on the bed or to improper spacing of the various sized articles on the bed.

In the operation of the apparatus, as described hereinabove, the heated work blanks of whatever width are automatically spaced apart from each other a predetermined percentage of the width of the blanks as they proceed into the cooling zone represented by the stationary members, thus insuring proper cooling of all blanks and avoiding unnecessary voids on the bed. Since this spacing of the articles varies directly as the widths of the articles the total area and the percentage of gas spaces through the bed is always constant for all articles of any width which results in maximum use of the bed at all times regardless of the widths of articles being cooled and consequently, in maximum operating efficiency of the bed. This spacing induces a flow of air or other surrounding cooling fluid up beneath the hot bed and then up into contact with the bed and bottoms of the articles and between the articles, throughout the entire length of the heated articles, thereby cooling the bed and the bottoms, tops and sides of the articles more or less uniformly and from end to end, and much more rapidly than is otherwise possible. The cooling of the sides of the articles is controlled to a considerable extent by the spaces between the articles through which cooling gases pass. Since, by the construction of the bed, these spaces bear a constant ratio to the width of the articles, articles of various widths may be uniformly cooled without any alteration to the bed and without any loss of efficiency of the bed either as regards the nature of the cooling or the quantity of articles cooled. Additional cooling fluids may, if desired, be discharged beneath the members 1 as by one or more conduits 43 having branch conduits 44 and outlets 44ª, the conduit 43 being connected to a suitable source of such fluid (not shown). Any desired means may be employed to force cooling fluid through conduit 43, if needed.

It will be understood by those skilled in the art that I have provided a hot bed which will automatically space apart articles of various widths from adjacent articles a predetermined percentage of their width so as to always obtain the most efficient cooling of the articles, and thereafter move the articles to the end of the hot bed without further change of the spacing between the articles. As a result, it is only necessary to deliver the articles of various widths to the hot bed in side by side contact for the hot bed will automatically space them apart the predetermined percentage of their width without any adjustment. This insures that the bed will always be filled with the maximum number of articles permissible with the maximum cooling, which means that the bed will be working at top capacity at all times regardless of the size of the articles delivered thereto. Moreover, my invention also results in a hot bed which is self-cooling as the separation of the articles creates a strong flow of air up through the articles and throughout the bed and in which, due to the fact that the articles are lifted and carried without friction, the article-supporting and carrying members may have correspondingly less contact surface thus allowing much less heating of the structure, and the cost of construction and operation of the bed correspondingly decreased without sacrificing strength or utility.

It will further appear that I have constructed a hot bed which is not only capable of inducing a natural draft of cooling gases between the articles which is automatically proportioned to the width of the articles being cooled, but in which the natural flow of cooling gases may be accelerated at will throughout part or all of the hot bed.

It will be understood that when the heated articles have been suitably cooled they may again be brought closer to each other, if desired, by merely reversing the order of surfaces 25, 26 and 27 at the discharge end of the hot bed.

In Fig. 2 I have shown, at the right hand end thereof, a roller 45 corresponding to rollers 42 and constituting a part of a conveyor onto which blanks delivered from the hot bed may be received and conducted away.

Although I have used the terms "automatic" and "automatically" with reference to the described method and apparatus for separating the articles to be cooled I do not intend thereby to limit my invention to the particular structure shown, but on the contrary employ the term in its broadest sense in which it includes any and all types of apparatus for separating articles for the purposes specified herein.

This application is a division of my copending application Serial No. 64,194, filed October 22nd, 1925.

Having thus described my invention, what I desire to secure by Letters Patent is defined in what is claimed.

What I claim is:

1. The method of cooling elongated, metallic articles which comprises delivering such articles in a heated condition in substantially side by side arrangement to a cooling zone, moving the articles into the cooling zone and gradually separating the articles from each other, thereby creating a flow of cooling fluid beneath and upwardly between the spaced articles, for then maintaining a predetermined spacing between the articles and the flow of cooling fluid therebetween during further movement of the articles.

2. The method of cooling elongated, highly heated, metallic articles which comprises delivering such articles in substantially side by side relation onto a hot bed, moving the articles while progressively separating the articles from each other up to a predetermined percentage of their widths thereby establishing a natural circulation of cooling fluid under the articles and up between the articles in progressively increasing amounts, and continuing to move the articles while maintaining the circulation of the cooling fluid until the articles have been cooled to the desired temperature.

3. The method of cooling elongated, metallic articles which comprises, delivering such articles in a heated condition to a hot bed, moving the articles along the hot bed, separating the moving articles from each other by distances which are a predetermined percentage of the widths of the articles thereby creating a natural flow of cooling gas up between the articles, and maintaining the separated relation of the articles until they are cooled.

4. The method of cooling elongated, metallic articles which comprises delivering such articles in a heated condition to a cooling zone, moving the articles in the cooling zone, separating the moving articles from each other by distances which vary directly as the width of the articles thereby creating a natural flow of cooling gas up between the articles, accelerating the natural flow of gas between the articles, and maintaining the said separated relation of the moving articles until they are cooled.

5. The method of cooling elongated articles of any given width which comprises, delivering such articles in a heated condition to a cooling zone in substantially side by side engagement, moving the articles in the cooling zone, separating the articles from each other by distances which varies directly as the widths of the articles thereby creating a natural flow of cooling gas past the sides of each article proportional to the width of the article, and maintaining the predetermined spacing of the articles until they are cooled to the desired temperature.

6. The method of cooling elongated articles of different widths which comprises moving such articles through a cooling zone and while in the said zone establishing a flow of cooling gas past the sides of each of said articles which is directly proportional to the widths of the respective articles, and continuing the flow of cooling gas until the articles reach the end of the cooling zone.

7. The method of cooling elongated metallic articles from a heated condition which includes the step of automatically spacing the articles in a cooling zone apart laterally from each other by distances which vary directly as the widths of the articles.

8. The method of cooling elongated metallic articles from a heated condition which includes the steps of automatically spacing the articles in a cooling zone apart laterally from each other by distances which vary directly as the widths of the articles, and moving the articles in the cooling zone while maintaining the said spaced relation.

9. The method of cooling elongated metallic articles which includes the steps of bringing such articles in a heated pliable condition into side by side contact with each other in a manner to insure straightening of the articles, and then separating the articles from each other in a cooling zone to accelerate cooling of the articles, the amount of separation between articles of the same width being constant to avoid warpage of the articles due to unequal cooling of opposite sides of the articles.

10. The method of cooling elongated metallic articles which includes the step of uniformly spacing articles of various given widths in a cooling zone so that the amount or percentage of gas spaces in the cooling zone is maintained constant for all said widths.

11. The method of cooling elongated metallic articles of different widths which includes the steps of bringing the articles into a cooling zone, and establishing a flow of cooling gas past the sides of each article which is directly proportioned to the widths of the articles.

In testimony whereof I hereunto affix my signature this 15th day of June, 1926.

WILLIS McKEE.